UNITED STATES PATENT OFFICE.

ELLSWORTH D. S. GOODYEAR, OF STAPLETON, NEW YORK, ASSIGNOR TO THE NEW YORK INDIA RUBBER COMPANY.

IMPROVEMENT IN PROCESSES FOR TREATING INDIA-RUBBER.

Specification forming part of Letters Patent No. 10,689, dated March 28, 1854.

*To all whom it may concern:*

Be it known that I, ELLSWORTH D. S. GOODYEAR, of Stapleton, in the county of Richmond and State of New York, have invented a new and useful improvement in forming in molds articles made of india-rubber, gutta-percha, or other gum, or of compounds made with one or more gums, in combination with other materials or articles made of any material which depend upon internal expansive force for their perfect formation in molds; and I do hereby declare that the following is a full and exact description thereof.

The forms, made of any material, intended to receive the impression of a pattern on the interior surface of molds are prepared in any of the known ways and of a size to fit the molds as near as may be, and water-tight, except a small hole to admit the water. I then pour into the opening water equal to from one sixty-fourth part of the capacity of the forms up to the whole of their capacity, according to the thickness and hardness of the material, as I find that a large or very small quantity of water does not act with so much force as about one-fourth of the capacity, and the thicker and harder the material the more force is required. I then close the opening in the usual way, put the forms into the molds, put strong iron clamps around the molds to keep them together, and then subject them to heat in the usual manner in which india-rubber and other substances, compounds of india-rubber or gutta-percha or other gums are vulcanized, varying the temperature from 212° to 600° Fahrenheit, according to the force required.

The advantages over the method heretofore used is that the steam forces the material with more power and certainty to assume the exact pattern of the mold.

I am aware that water has been forced into the interior of hollow articles of plastic material by mechanical means for the purpose of forcing the material against the interior of molds, but such mode of using a fluid I do not claim; but

What I claim as my invention, and desire to secure by Letters Patent, is—

The introduction of water or any other liquid into the interior of articles which require expansive force for their perfect formation to the interior surface of molds, said liquid to be converted into steam, substantially as described, and for the purposes specified.

E. D. S. GOODYEAR.

Witnesses:
JOHN MACKENZIE,
CHAS. S. MUNGER.